Aug. 26, 1969

L. H. GOLLWITZER 3,464,058

METHOD AND APPARATUS FOR TRANSMITTING
SIGNALS FROM A TOOL IN A BOREHOLE

Filed Aug. 10, 1967

Lee H. Gollwitzer
INVENTOR.

BY Edward M. Roney

ATTORNEY

Fig. 2A — SECONDARY PULSE TRANSMISSION

Fig. 2B — PRIMARY PULSE SOURCE

Fig. 2C — DELAY ONE-SHOT 19

Fig. 2D — ONE-SHOT 20

Fig. 2E — PRIMARY PULSE TRANSMISSION

Fig. 2F — PULSES ON CABLE AT SURFACE

Fig. 4A — SECONDARY PULSE TRANSMISSION

Fig. 4B — PRIMARY PULSE SOURCE 50

Fig. 4C — OUTPUT OF OR-GATE 58

Fig. 4D — PRIMARY PULSE TRANSMISSION

Lee H. Gollwitzer
INVENTOR.

BY Edward M. Roney

ATTORNEY

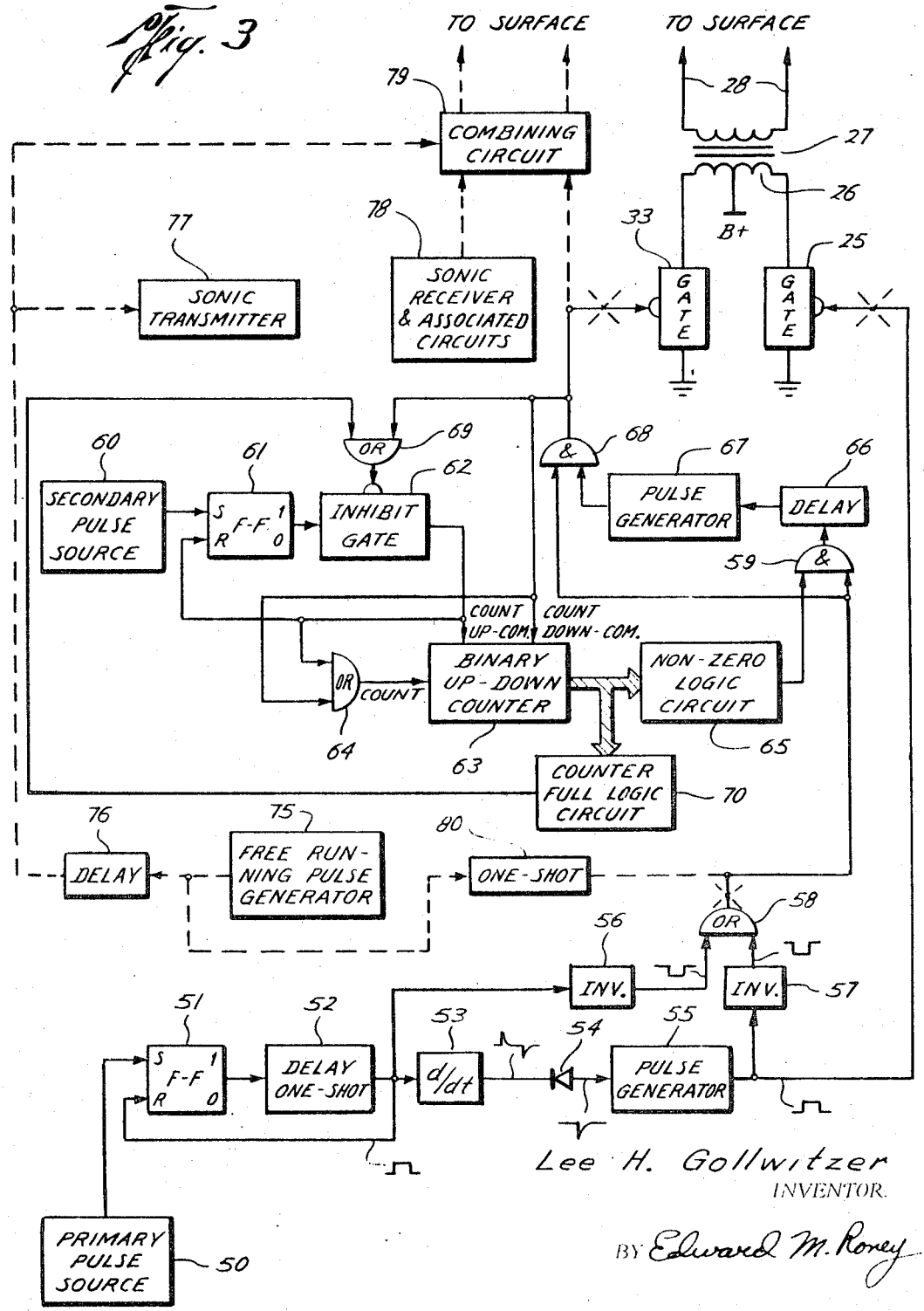

United States Patent Office 3,464,058
Patented Aug. 26, 1969

3,464,058
METHOD AND APPARATUS FOR TRANSMITTING SIGNALS FROM A TOOL IN A BOREHOLE
Lee H. Gollwitzer, Houston, Tex., assignor to Schlumberger Technology Corporation, Houston, Tex., a corporation of Texas
Filed Aug. 10, 1967, Ser. No. 659,784
Int. Cl. G01v 1/40
U.S. Cl. 340—18     13 Claims

ABSTRACT OF THE DISCLOSURE

The particular embodiments described herein as illustrative of the invention describe a technique for transmitting pulses of secondary importance from a well tool in a borehole to the surface of the earth on the same transmission medium with signals of primary importance which cannot be interfered with. This is accomplished without losing any of the secondarily important pulses by blanking out the secondarily important pulse transmission channel in response to the primarily important signals to allow uninhibited transmission of the primary importance signals and storing the secondarily important pulses for later transmission.

---

This invention relates to methods and apparatus for transmitting information from a well tool in a borehole to the surface of the earth over a transmission medium, such as a conductor pair. More particularly, the invention relates to the transmission of well logging signals derived from a plurality of investigating apparatus at the tool wherein the information from one of the downhole investigating apparatus must be transmitted to the surface of the earth without interference from the data transmitted from any other downhole investigating apparatus.

One common method of transmitting information to the surface of the earth is to transmit a plurality of pulses over a conductor pair, such as a monocable, to the surface of the earth wherein the rate at which these pulses are transmitted is representative of the desired information. In many cases, the information derived from one or more of the information sources in the tool is already in the form of pulses, as for example, when the particular information source is a radioactivity logging apparatus. Another common manner of utilizing pulses for the transmission of information to the surface of the earth occurs where an analog type signal is converted to a pulse rate, as by a standard integrator triggering a voltage sensitive trigger which in turn resets the integrator. In this manner, pulses are generated at a rate depending on the magnitude of the current feeding the integrator.

It is sometimes the case that the information transmitted from one of the information sources in the tool must be transmitted to the surface of the earth in the same time relationship with which they are derived. That is to say, the signals derived from a particular apparatus at the tool cannot be delayed or inhibited from transmission up the cable to the surface of the earth. Such information will hereinafter be referred to as "primary importance information," such term referring to the time dependence of the information and not the overall importance of the log. This primary importance information may take the form of pulses, as from a radioactivity logging tool, or it may take the form of sinusoidal type signals, such as the type of signals found in sonic logging apparatus. Specific examples of such primary importance information can be found in copending application Ser. No. 649,978, entitled "Methods and Apparatus for Monitoring and Controlling a Tool in a Borehole," by Herbert J. Hart and filed on June 29, 1967, or application Ser. No. 592,795, entitled "Methods and Apparatus for Measuring Neutron Characteristics of Material," by William B. Nelligan and filed on Nov. 8, 1966.

In the above-mentioned Hart application, apparatus is described for monitoring and controlling the operation of a core slicing tool in a borehole. The core slicing apparatus includes a cutting means which is driven by a motor. An operating characteristic of the motor is monitored to determine when the motor is becoming overloaded so that corrective action may be taken to prevent the motor from stalling out. This operating characteristic is transmitted to the surface of the earth as a pulse train whose rate is representative of the measured characteristic and is transmitted on the same conductor pair as opposite polarity pulses representative of other information concerning the core slicing operation. However, the information concerning the motor operating characteristic is of primary importance and should not be interferred with by the opposite polarity pulses representative of the other core slicing information since, if the motor stalls out, the cutting means may become stuck in the formation.

This interference of the motor characteristic pulses by the other opposite polarity pulses can take the form of the opposite polarity pulses erasing one another or the voltage overshoot from pulses of one polarity interfering with the pulses of another polarity. This overshoot is caused by such things as the distributed capacitance in the cable and filters at the tool and at the surface of the earth. These filters are usually present to filter out the low frequency power which is many times supplied on the same conductor pair that is utilized for pulse transmission.

In the above-mentioned Nelligan copending application, the timing of receiver pulses transmitted from the logging apparatus relative to an initiating transmitter pulse is important, and thus it is desirable that these pulses be transmitted to the surface of the earth without hindrance. However, when the signals from one information source in the tool must be transmitted without hindrance from pulses transmitted from other information sources on the same conductor pair, a problem arises in what to do with the pulses from the secondary importance logging apparatus.

Several schemes have been suggested for transmitting primarily important information at the same time as secondary importance information. One such scheme is to inhibit transmission of the secondary importance information to the surface of the earth during the time that the primary importance information is being transmitted. However, this decreases the accuracy of the secondary information and where, in some cases, the transmission of the primary importance information can take place for a substantial amount of time, the inaccuracy caused to the secondary information can be substantial. Another scheme utilized in the case where sinusoidal type signals, such as those found in sonic logging, are transmitted simultaneously with pulses representative of other well logging apparatus is to provide suitable filtering to separate the two signals. However, the above-mentioned cable capacitance, which acts as a low-pass filter, causes the pulses to become distorted in shape and thus add in undesired voltage components to the transmitted sinusoidal type signals.

It is an object of the present invention, therefore, to provide new and improved methods and apparatus for transmitting information from a plurality of information sources in a tool in a borehole to the surface of the earth over a single conductor pair.

It is another object of the present invention to provide new and improved methods and apparatus for transmitting information of primary importance without hindrance from other information, and yet still accurately transmit the other information to the surface of the earth.

In accordance with the present invention, methods and apparatus for processing signals for transmission from a tool in a borehole to the surface of the earth over a transmission medium, comprises generating first information signals representative of first information for transmission to the surface of the earth, generating pulses representative of a second information, and supplying the pulses representative of the second information to the transmission medium for transmission to the surface of the earth. The methods and apparatus further comprise inhibiting the transmission of the second information pulses to the surface of the earth during selected time intervals so that the second information pulses will not interfere with the first information signals, and storing the pulses representative of the second information for later transmission to the surface of the earth so that the inhibited second information pulses will not be lost.

For a better understanding of the present invention, together with other and further objects thereof, reference is had to the following description taken in connection with the accompanying drawings, the scope of the invention being pointed out in the appended claims.

Referring to the drawings:

FIGURES 2A–2F show voltage wave forms at various points in the FIGURE 1 circuitry for purposes of better explaining the operation of the FIGURE 1 apparatus;

FIGURE 3 shows a plurality of information sources in a tool in a borehole along with apparatus for transmitting the information from all of the sources over a single conductor pair to the surface of the earth in accordance with another form of the present invention; and FIGURES 4A–4D show voltage wave forms at various points in the FIGURE 3 apparatus for purposes of better explaining the operation thereof.

Figure 1:
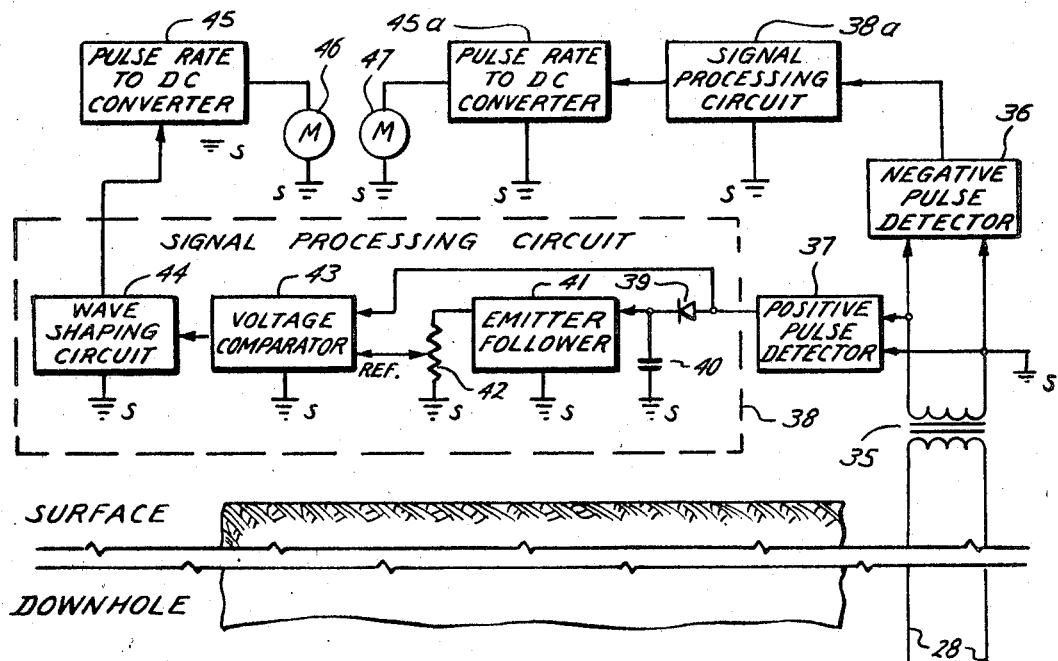
FIGURE 1 shows a tool in a borehole along with apparatus for transmitting information derived from a plurality of sources in the tool to the surface of the earth over a single conductor pair in accordance with the present invention.
Figure 1:
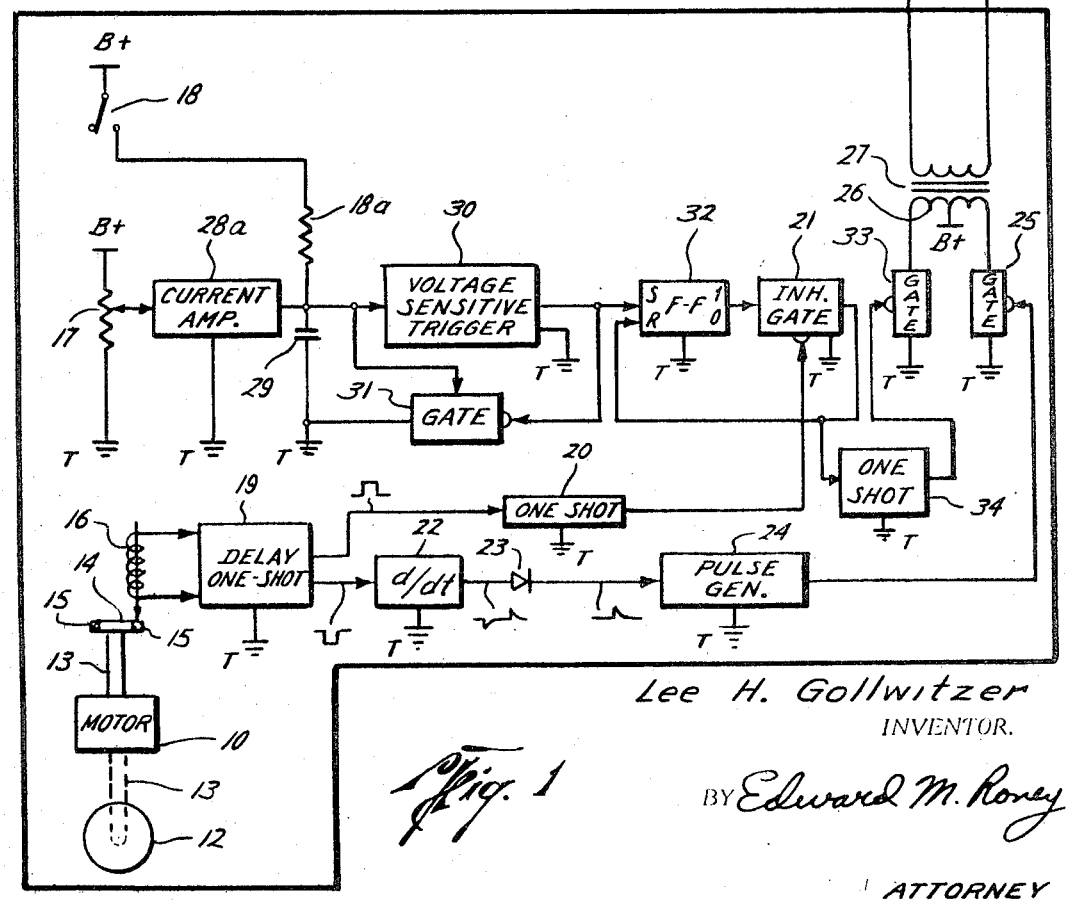

Looking now at FIGURE 1, there are shown three information sources used in connection with the core slicing tool disclosed in the above-mentioned Hart copending application. The Hart application, as discussed earlier, discloses apparatus for monitoring and controlling the operation of a core slicing tool in a borehole. These monitoring operations comprise monitoring the speed of a motor which drives a cutting means, monitoring the position of the cutting means, and monitoring hydraulic pressure utilized in anchoring the tool in the borehole.

In FIGURE 1, there is shown a motor 10 for driving a cutting means 12 via a power transmission means 13 which is flexibly coupled to the motor 10 so as to move the cutting means 12 outward into the adjoining earth formations. Also attached to the shaft 13 is a circular disc 14 having magnetic elements 15 diagonally opposite one another. A suitable pickup coil 16 is disposed adjacent to the disc 14 so as to have a signal induced therein each time one of the magnetic elements 15 passes the pickup coil 16. Thus, pickup coil 16 will have a signal induced therein every half revolution of the disc 14. The assembly comprising motor 10, shaft 13, and cutting means 12 is adapted to move in a longitudinal direction by suitable means (shown in the copending Hart application) so as to slice a core from the adjoining formations. To monitor this longitudinal movement, a potentiometer 17 is provided whose resistance portion is connected between a suitable voltage source B+ and the tool ground, designated T. The wiper arm of the potentiometer 17 is arranged to move in accordance with the longitudinal movement of the cutting means 12. The core slicing tool also includes a hydraulic pressure switch 18 which closes upon the hydraulic pressure of the hydraulic anchor means falling below a predetermined level. The mechanical features of the core slicing tool have been shown in functional diagrammatic form to provide a better understanding of how the electrical features of the present invention fit in with the mechanical apparatus, the mechanical apparatus not being a part of the present invention. The mechanical details of the core slicing tool are shown in copending application Ser. No. 649,929, now Patent No. 3,430,713, by C. P. Lanmon.

The signals from the pickup coil 16 are supplied to a suitable delay one-shot 19, which has an "on-time" less than the time interval between signals from pickup coil 16. The positive pulse output from delay one-shot 19 is supplied to another one-shot 20 which generates a pulse having an on-time greater than the on-time of delay one-shot 19. This output pulse from one-shot 20 is supplied to the control terminal of an inhibit gate 21. The negative pulse output from delay one-shot 19 is supplied through a suitable differentiator 22 and forward-biased diode 23 to the input of a pulse generator 24, which could comprise a one-shot, for example. The pulse generator 24 is therefore triggered on the lagging edge of the pulse output from delay one-shot 19. The pulse output from pulse generator 24 is supplied to the control terminal of a gate 25 which is connected between one side of the primary winding 26 of a transformer 27 and the tool ground. The center tap of primary winding 26 is connected to the downhole supply voltage B+. The secondary winding of transformer 27 is connected to a conductor pair 28 which transmits the signals transmitted from the tool to the surface of the earth.

The wiper arm of potentiometer 17 is connected to the input of a current amplifier 28a whose high impedance output is connected to a capacitor 29, the input of a voltage sensitive trigger 30, and the input to a gate 31. The output from voltage sensitive trigger 30 (which could comprise a Schmitt trigger, for example) is connected to the set input of a flip-flop 32 and to the control terminal of the gate 31. The "1" output of flip-flop 32 is supplied through the inhibit gate 21, if unenergized, to energize a one-shot 34 and reset the flip-flop 32. The pulse output from one-shot 34 is supplied to a gate 33 which, when energized, connects the other side of the primary winding 26 to tool ground. It can be seen that pulses of opposite polarity are transmitted to the surface of the earth on conductor pair 28, the particular polarity depending on which gate 25 or 33 is energized.

In operation, the voltage on the wiper arm of potentiometer 17, which is proportional to the position of cutting means 12, causes current amplifier 28a to supply a constant output current for any given position of the wiper arm to charge up the capacitor 29. When the charge on the capacitor 29 reaches the threshold voltage of voltage sensitive trigger 30, flip-flop 32 is set and capacitor 29 is discharged through the gate 31. If inhibit gate 21 is unenergized, the "1" output of flip-flop 32 causes one-shot 34 to energize gate 33 for a time interval equal to the "on-time" of one-shot 34. This momentary energization of gate 33 causes a pulse of one polarity to be transmitted up the conductor pair 28.

Thus, it can be seen that the position of the wiper arm of potentiometer 17 controls the magnitude of the current supplied to the capacitor 29, which in turn varies the rate at which the capacitor charges to the threshold voltage of voltage sensitive trigger 30. Thus, assuming inhibit gate 21 is unenergized, the rate at which pulses are supplied to gate 33 will be proportional to the position of the cutting means 12.

To transmit an indication of low hydraulic anchor pressure to the surface of the earth, the hydraulic pressure switch 18 is coupled through a relatively low valued resistor 18a to the capacitor 29. When the switch 18 is closed, a relatively large current will be supplied to capacitor 29, thus changing the rate at which capacitor 29 will be charged up. This, then increases the rate of pulses applied to gate 33 to beyond the maximum pulse rate due to the cutting means position indications.

Now referring to the circuitry at the surface of the earth, the conductor pair 28 couples the opposite polarity pulses through a suitable transformer 35, the secondary winding of which is connected to negative and positive pulse detectors 36 and 37, which could comprise suitably arranged diodes, for example. One side of the secondary winding is grounded to the surface ground S. Concerning first the positive pulse channel, the output from positive pulse detector 37 is supplied to a signal processing circuit 38. More specifically concerning circuit 38, the output from positive pulse detector 37 is coupled through a forward-biased diode 39 to a capacitor 40 shunted to ground and a suitable high input impedance amplifying device 41, such as an emitter follower. The output signal from emitter follower 41 is connected across the resistance portion of a potentiometer 42, the wiper arm of which is connected to the reference voltage input of a voltage comparator 43.

The diode 39, capacitor 40, and emitter follower 41 act as a peak detecting circuit with the capacitor 40 always charging to the peak voltage of the pulses from positive pulse detector 40 through the low impedance forward-biased diode 39, and holding that peak voltage during the interval between pulses from positive pulse detector 37. The emitter follower 41 therefore provides an output voltage which is proportional to this peak voltage and the potentiometer 42 reduces the voltage to some desired fraction thereof. Thus the reference voltage supplied to voltage comparator 43 is a DC voltage whose magnitude is a fraction of the detected peak voltage. The signal input to voltage comparator 43 is supplied from the output of positive pulse detector 37. Thus, voltage comparator 43 acts to pass only those pulses from positive pulse detector 37 which exceed the reference voltage. There is also a similar signal processing circuit 38a for performing the same function on the pulses from negative pulse detector 36. To facilitate the fact that these pulses are negative, the negative pulse detector 36 includes a suitable inverter so as to supply positive pulses to signal processing circuit 38a.

To understand the purpose of the signal processing circuit 38, refer to FIGURES 2E and 2F. The positive pulse of FIGURE 2E represents the wave shape of a pulse supplied to the conductor pair 28 for transmission to the surface of the earth. The positive going wave shape of FIGURE 2F directly under the pulse of FIGURE 2E represents how this positive pulse may look as it is received in the circuitry at the surface of the earth. It is seen that there is a large trailing undershoot associated with this pulse. The pulse on the left-hand side of FIGURE 2A and the corresponding (timewise) pulse of FIGURE 2F represents the same occurrence for a negative pulse transmitted to the surface of the earth.

In the past, there has been problems with these undershoot and overshoot pulse portions triggering the opposite polarity channel thus causing an erroneous indication. One way to overcome this is to provide a voltage discriminating amplifier to pass only those pulses whose magnitudes exceed a predetermined level based on the fact that the undershoot or overshoot will be some fraction of the voltage magnitude of the main desired portion of the pulse which is to be detected. However, the magnitude of this main desired pulse portion may vary as the tool is moved through the borehole due to such things as changes in temperature, cable length, etc. The signal processing circuits 38 and 38a act to adjust the reference voltage applied to the voltage comparator 43 in accordance with the detected peak voltage to always maintain the threshold of voltage comparator 43 at a level to prevent the overshoots and undershoots from passing through comparator 43. By reading the peak voltage and scaling it down, the circuit acts to take into account the change in the magnitudes of the pulses received at the surface of the earth.

The output pulses from a comparator 43 are applied to a suitable wave-shaping circuit 44, such as a one-shot, for example, for supplying output pulses having a constant "on-time" and magnitude to a suitable pulse rate to DC converter 45. The varying DC output signal proportional to pulse rate is supplied to a suitable voltmeter 46. In like fashion, the pulse output signal from signal processing circuit 38a is supplied to another pulse rate to DC converter 45a and the resulting DC voltage indicated by a meter 47. Thus, assuming the motor speed pulses are positive and the cutting means position pulses are negative, motor 46 will indicate motor speed and meter 47 will indicate cutting means position.

Now concerning the operation of the FIGURE 1 downhole apparatus, it is important to transmit the pulses representative of motor speed to the surface of the earth without hindrance from the opposite polarity pulses representative of the cutting means position or hydraulic pressure. The reason for this is that the speed of the motor provides an indication of when the motor is ready to stall out, to allow preventive measures to be quickly taken. However, due to the undershoot and overshoot problems discussed earlier, the transmission of the cutting means position and hydraulic pressure pulses must be adjusted to not interfere with the transmission of the motor speed pulses. Also, it might be desirable to keep the motor speed pulses from interfering with the cutting means position and hydraulic pressure pulses. To accomplish this, these latter pulses are transmitted a sufficient time interval after the transmission of each motor speed pulse. However, since the motor speed pulses are of prime importance, it can happen that while a cutting means position or hydraulic pressure pulse is being delayed for this sufficient time interval after the transmission of a motor speed pulse, another motor speed pulse may be ready for transmission thus causing the cutting means position or hydraulic pressure pulse to be further delayed. This can cause undesirable inaccuracies in the secondarily important cutting means position and hydraulic pressure pulses.

In the downhole circuitry of FIGURE 1, the primarily important motor speed pulses from pickup coil 16 are delayed from being generated from pulse generator 24 for transmission by delay one-shot 19. At the same time, the one-shot 20 blanks out the opposite polarity pulse channel by energizing inhibit gate 21. By so doing, the motor speed pulses will all be transmitted to the surface of the earth, after the delay by delay one-shot 19, without hindrance from the opposite polarity pulses. By the same token, the transmission of the position and pressure pulses is delayed by one-shot 20 for a sufficient time interval that they will not be interfered with by any previously transmitted motor speed pulses. It should also be noted that, in the event that inhibit gate 21 is energized during the transmission of a position or pressure pulse, the entire position or pressure pulse will be transmitted since one-shot 34 cannot be blanked out.

Referring to FIGURES 2A–2F to better understand this operation, the negative pulse on the left-hand side of FIGURE 2A represents the cutting means position or hydraulic pressure pulse as it would look being applied to gate 33. The negative pulse and subsequent positive overshoot of FIGURE 2F represents how this transmitted pulse will appear in the circuitry at the surface of the earth. Now, assume that a signal is induced in pickup coil 16 at the time shown in FIGURE 2B (i.e., slightly after the pulse of FIGURE 2A). The wave form of FIGURE 2C shows the resulting pulse output of delay one-shot 19 and the pulse of FIGURE 2E shows the positive pulse output from the pulse generator 24. FIGURE 2F shows the resulting positive pulse and subsequent negative undershoot at the surface of the earth.

It can be seen that, due to the delay by delay one-shot 19, the pulse from pulse generator 24 (the pulse of FIGURE 2E) is not generated until the overshoot caused by the opposite polarity pulse of FIGURE 2A has died away to approximately zero. The reason for this long delay can be seen by referring to the signal processing circuit 38 at the surface of the earth, where the capacitor 40 charges up the peak voltage of each pulse, but discharges slowly. It can be seen that if a positive pulse (motor speed pulse) were transmitted while the positive overshoot due to prior transmitted negative pulse were still present, the peak voltage of the transmitted positive pulse would add to the overshoot voltage to cause capacitor 40 to charge to a voltage higher than the true peak voltage. In this event, the reference voltage applied to voltage comparator 43 would be too high, thus causing the possibility that true positive pulses would not be passed by voltage comparator 43. This same thing would, of course, apply to the negative pulse channel.

Although the signal processing circuit 38 provides greatly improved results in detecting pulses at the surface in an opposite polarity pulse transmission system, it may not always be necessary to utilize this much sophistication in the surface detecting circuitry, and thus the delay between pulses at the tool may not have to be so great. However, in any event, even if this automatic adjustment of the reference voltage of comparator 43 were not used at the surface of the earth, it would still be desirable to provide some delay between the opposite polarity pulse transmission to keep noise from combining with the overshoot or undershoot to erroneously trigger the wrong channel. Also, as can best be seen in FIGURES 2E and 2F, there is a trailing portion (the hatched line pulse portion of FIGURE 2F) of the pulse received at the surface which extends beyond the trailing edge of the transmitted pulse (see FIGURE 2E) and of the same polarity thereof which would tend to subtract from an opposite polarity pulse transmitted too soon thereafter.

Now considering what happens when the capacitor 29 charges up to the reference voltage of voltage sensitive trigger 30 during the time that inhibit gate 21 is energized, it can be seen that the resulting output voltage from voltage sensitive trigger 30 will set flip-flop 32 and reset the capacitor 29 via gate 31. In this manner, the secondary pulse representative of cutting means position or hydraulic pressure will be stored in flip-flop 32, and at the same time, capacitor 29 can begin charging up again to produce the next pulse. This nontransmitted pulse is represented in FIGURE 2A by the dotted line pulse. Now, when inhibit gate 21 is de-energized, this dotted line pulse is then transmitted, as represented by the subsequent solid line pulse of FIGURE 2A and flip-flop 32 is reset to receive another pulse. Note that the secondary pulse of FIGURE 2A, will therefore, not be transmitted while an overshoot from the primary pulse is still on the cable because of the action of the blank out pulse from one-shot 20. By this means, the primary pulses of FIGURE 2E can be transmitted without hindrance from the secondary pulses of FIGURE 2A, or vice versa, and the secondary pulses will not be lost. In addition, since flip-flop 32 stores the secondary pulses, the operation of capacitor 29 charging up to produce new pulses will not be interfered with.

Now referring to FIGURE 3, there is shown another embodiment of the present invention. In the FIGURE 1 embodiment, the pulses from the secondarily importance pulse channel are assumed to be generated at a rate that would require only one memory element, i.e., flip-flop 32, without losing any of these secondarily important pulses. The embodiment of FIGURE 3 represents the case where the pulse rate from the secondary pulse source can be sufficiently great that a multitude of pulses may be missed while the primary pulse transmission channel is blanking out the secondary pulse transmission channel. For example, the secondary pulse source may have a widely varying pulse rate wherein the pulse rate during certain times will be substantially high. Or, on the other hand, the primary pulse source may be substantially high a ttimes, thus causing substantially long blank out periods of the secondary pulse transmission channel, or a combination of both.

In the FIGURE 3 apparatus, a primary pulse source 50 supplies pulses to the set input of a flip-flop 51 whose "1" output is supplied to the input of a delay one-shot 52. The positive going output from delay one-shot 52 is supplied back to the reset input of flip-flop 51 and through a differentiator circuit 53 and back-biased diode 54 to the input of a pulse generator 55. In this manner, pulse generator 55 is triggered on the trailing edge of the output from delay one-shot 52. The positive going pulse output from pulse generator 55 energizes gate 25 which drives the transformer 27 in the same manner as the similarly designated elements in FGURE 1. The positive going outputs from delay one-shot 52 and pulse generator 55 are inverted by a pair of inverters 56 and 57 and the inverted signals supplied through an OR gate 58 to one input of an AND gate 59 and one input of an AND gate 68.

Now looking at the secondary pulse channel, a secondary pulse source 60 provides pulses to the set input of a flip-flop 61 whose "1" output is supplied through an inhibit gate 62, if unenergized, to the "count-up" command control input of a binary up-down counter 63, to one input of an OR gate 64, and back to the reset input of flip-flop 61. The output from OR gate 64 is supplied to the "count" input of the binary up-down counter 63. Thus, when pulses are generated from the secondary pulse source 60 and inhibit gate 62 is unenergized, each one of these generated pulses will cause binary up-down counter 63 to count up by one count and also reset the flip-flop 61 for another pulse.

A "nonzero" logic circuit 65 is connected to the "1" output from each stage of the counter 63 so as to provide a constant output signal so long as there is a "1" in any stage of the counter 63. This circuit could suitably comprise a standard OR gate. The output signal from nonzero logic circuit 65 is supplied to the other input of AND gate 59. The output from AND gate 59 is supplied to the input of a delay circuit 66 which delays any output signal from AND gate 59 for a given delay time. After the delay by delay circuit 66, the output signal from AND gate 59 energizes a suitable pulse generator 67, such as a one-shot, which supplies a pulse of constant pulse width to the other input of AND gate 68. The output pulse from AND gate 68 is utilized to energize the gate 33 to supply a pulse to the surface of the earth via conductor pair 28, to the "count-down" command input of counter 63, to the other input of OR gate 64, and to one input of an OR gate 69. The output from OR gate 69 is utilized to energize the inhibit gate 62. The other input to OR gate 69 is supplied from a "counter-pull" logic circuit which supplies an output signal when every stage of the counter 63 has a "1." The "counter-full" logic circuit could suitably comprise an AND gate connected to the "1" output of every stage of counter 63.

Now concerning the operation of the FIGURE 3 apparatus, the pulses from secondary pulse source 60 are momentarily sorted in flip-flop 61 in the event that inhibit gate 62 is energized so that these pulses will not be lost. If inhibit gate 62 is unenergized, the counter 63 will proceed to count each pulse from secondary pulse source 60. The "nonzero" logic circuit 65 will provide a constant output signal so long as there is a count present in counter 63, which after a delay by delay circuit 66, causes pulse generator 67 to supply a pulse to gate 33 for transmission to the surface of the earth. At the same time that this pulse is being applied to gate 33, the binary up-down counter 63 is caused to count down one count to account for the fact that a pulse has been transmitted. Since the counter 63 cannot count up and down at the same time, inhibit gate 62 is energized by OR gate 69 during this count down operation and flip-flop 61 stores any pulses which may be generated from secondary pulse source 60 during this count down operation. The "counter-full" logic circuit 70 acts to inhibit the counter 63 from counting up if it is determined that the counter is full, so as to keep the counter from resetting. This is strictly a safety procedure and the counter 63 should normally have enough stages to take care of the maximum expected number of counts at any one itme.

Thus, it can be seen that, so long as the output from OR gate 58 is "1," the pulses from secondary pulse source 60 will be stored in counter 63 and transmitted to the surface of the earth at a rate depending on the delay time of delay circuit 66. The purpose of delay circuit 66 is to keep the secondary pulses from interfering with each other. That is to say, if these secondary pulses are transmitted at too fast of a rate, it would be difficult to resolve each pulse at the surface of the earth due to the frequency response (e.g., overshoot and undershoot) of the transmission system.

Now concerning the operation of the primary and secondary pulse transmission channels together, the pulses from primary pulse source 50, after a delay by delay one-shot 52, are regenerated by pulse generator 55 for transmission to the surface of the earth. This operation proceeds without hindrance from the secondary pulse transmission channel. If a pulse from the primary pulse source is generated while delay one-shot 52 is "on," the flip-flop 51 will hold the pulse until delay one-shot 52 has turned off, at which time delay one-shot 52 will be immediately re-energized. This re-energization of delay one-shot 52 will again reset the flip-flop 51 to receive another pulse from primary pulse source 50. As long as either delay one-shot 52 or pulse generator 55 are on, AND gates 59 and 68 will not be allowed to pass the pulses in the secondary pulse transmission channel. This operation acts to keep the secondary pulses from interfering with the primary pulses, yet by including the pulse storage circuitry of FIGURE 3, none of the secondary pulses will be lost.

Now referring to FIGURES 4A–4D, to better understand the operation of the FIGURE 3 apparatus, FIGURE 4A shows the pulse supplied to the gate circuit 33, i.e., the secondary pulse transmission. Looking at FIGURE 4B, there is shown a pulse generated from the primary pulse source 50 a short time interval after a secondary pulse has been transmitted. Looking at FIGURE 4C, there is shown the output signal from OR gate 58 which is applied to AND gates 59 and 68 of FIGURE 3. It can be seen that the primary pulse of FIGURE 4B causes the output of OR gate 58 to go to zero, which blanks out the secondary pulse channel. The pulses of FIGURE 4D represent the output from pulse generator 55, the primary pulse transmission.

Now assuming that there is a "1" in at least one of the stages of counter 63, causing "nonzero" logic circuit 55 to energize AND gate 59, when the output of OR gate 58 (see FIGURE 4C) goes to "1" at time $t_1$ (see FIGURE 4A), the delay circuit 66 is initiated. After this delay (this delay time is shown in FIGURE 4A) the secondary pulse is then generated by pulse generator for transmission to the surface of the earth and counter 63 is counted down by one count (the generated secondary pulse is shown in dotted line form in FIGURE 4A for reasons to be discussed later). By this means, a secondary pulse of FIGURE 4A cannot interfere with a transmitted primary pulse of FIGURE 4D, or vice versa.

Now consider what happens if a pulse from primary pulse source 50 is generated during this delay interval of delay circuit 66. This condition is represented in FIGURE 4B by the pulse 72. Again, as shown in FIGURE 4C, the output of OR gate 58 goes to zero for a given time interval. Now, at the time $t_1$, when the output of OR gate 58 went to "1," if there was an output from nonzero logic circuit 65, the delay circuit 66 was energized via AND gate 59. But however, the AND gate 68 is now unable to pass the pulse from generator 67 to gate 33, since the output of OR gate 58 has gone to zero due to the new primary pulse 72 (FIGURE 4B). (The output pulse from pulse generator 67 is represented as the dotted line pulse in FIGURE 4A). Therefore, this pulse cannot be transmitted to the surface of the earth. However, the counter 63 is not caused to count down until a pulse is actually transmitted, and thus there is no secondary pulse error.

Now, at time $t_2$, the output of OR gate 58 goes to "1" and since no pulses are generated from primary pulse source 50 during this delay time (the time interval $t_2$ to $t_3$ in FIGURE 4A), a secondary pulse is generated from pulse generator 67 at time $t_3$ (FIGURE 4A). Since OR gate 58 now has a "1" output, this secondary pulse generated at time $t_3$ is supplied to gate 33 for transmission to the surface of the earth.

Thus, it can be seen that by utilizing the apparatus of FIGURE 3, the pulses from a primarily important pulse source can be transmitted to the surface of the earth without hindrance from a secondarily important pulse source and, at the same time, the opposite polarity pulses from the secondarily important pulse source can be transmitted even though there are a plurality of secondary pulses generated by the pulse source 60 during the time that the secondary pulse channel is blocked.

The present invention is not limited to the primarily important information channel generating pulses only, but could include any other type of signal transmission. This is represented in FIGURE 3 by the circuits designated 75 through 80, which are connected by dotted lines. The dotted line $x$'s on certain of the solid line conductors represent the fact that these conductors would not be present under this alternative embodiment. The alternative embodiment shows a sonic logging apparatus, which is substituted for the primary pulse source 50, in combination with the secondary pulse source 60 and the downhole transmission circuits associated therewith, which were previously discussed.

A free running pulse generator 75, such as an abstable multivibrator, supplies pulses at a fixed pulse rate to a sonic transmitter 77 via a delay circuit 76. Delay circuit 76 serves the same purpose of delay one-shot 52 discussed earlier. The received sonic signal picked up by the receiver (which is generally located a given distance away from the sonic transmitter) as well as the sonic transmitter pulse, are supplied to a suitable combining and cable driving circuit 79 for transmission to the surface of the earth. Also connected to the combining and cable driving circuit 79 is the secondary pulse output from AND gate 68. The output pulses from the free running pulse generator 75 are supplied to a suitable one-shot 80, whose negative pulse output takes the place of the blank-out signal from OR gate 58, i.e., it blanks out the secondary pulse transmission channel. In this manner, the primarily important sonic well logging information can be transmitted to the surface without being affected by the secondary pulses and, at the same time, the secondary pulses can also be transmitted to the surface of the earth on the same conductor pair 28 without losing any of these secondary pulses.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. Apparatus for processing signals for transmission from a tool in a borehole to the surface of the earth over a transmission medium, comprising:
  (a) a first information means for supplying first information signals representative of first information to the transmission medium for transmission to the surface of the earth;
  (b) a second information means adapted to generate pulses representative of second information;
  (c) means for supplying the pulses representative of the second information to the transmission medium for transmission to the surface of the earth;
  (d) means coupled to the first information means for inhibiting the transmission of the second information pulses to the surface of the earth during selected time intervals so that the second information pulses will not interfere with the first information signals; and
  (e) means for storing the pulses representative of the second information for later transmission to the surface of the earth so that the inhibited second information pulses will not be lost.

2. The apparatus of claim 1 wherein the means for generating escond information signals includes:
  (1) means for generating a current which is substantially constant for any given level of the second information;
  (2) charge storage means responsive to the current for generating a voltage which varies with time as a function of the current;
  (3) threshold means for generating an output signal when the time varying voltage reaches a predetermined threshold level and supplying the output signal to the pulse storage means; and
  (4) means responsive to the output signal for immediately resetting the charge storage means.

3. The apparatus of claim 1 wherein the pulse storage means is a bistable device adapted to be set by a generated second information pulse for causing a second information pulse to be transmitted if not inhibited by the inhibiting means, the bistable device being reset upon a second information pulse being supplied to the transmission medium for transmission to the surface of the earth.

4. The apparatus of claim 2 wherein the pulse storage means is a bistable device adapted to be set by the output signal from the threshold means and reset by each second information pulse that is supplied to the transmission medium for transmission to the surface of the earth.

5. The apparatus of claim 1 wherein the first information signals are pulses and the first information means includes means for delaying the transmission of the first information pulses so that any previously transmitted second information pulses will not interfere with the first information pulses; and the means for inhibiting the transmission of the second information pulses inhibits said transmission for the time delay of the first information pulses plus another time period so that neither the first nor second information pulses will interfere with each other.

6. The apparatus of claim 1 wherein the means for storing pulses includes:
  (1) counting means for counting the number of generated second information pulses;
  (2) means for detecting if there is a count existing in the counting means and generating an output signal representative thereof;
  (3) delay means for delaying the output signal; and
  (4) means for generating output pulses representative of the second information for transmission to the surface of the earth in response to the delayed output signal and subtracting one count from the counting means.

7. The apparatus of claim 6 wherein the means for inhibiting the transmission of the second information pulses includes means for inhibiting the output signal from the count detecting means and the output pulses representative of the second information.

8. A method of processing signals for transmission from a tool in a borehole to the surface of the earth over a transmission medium comprising:
  (a) generating first information signals representative of a first information for transmission to the surface of the earth;
  (b) generating pulses representative of a second information;
  (c) supplying the pulses representative of the second information to the transmission medium for transmission to the surface of the earth;
  (d) inhibiting the transmission of the second information pulses to the surface of the earth during selected time intervals so that the second information pulses will not interfere with the first information signals; and
  (e) storing the pulses representative of the second information for later transmission to the surface of the earth so that the inhibited second information pulses will not be lost.

9. The method of claim 8 wherein the first information signals are pulses and the step of generating first information pulses includes delaying the first information pulses for a selected time interval; and the step of inhibiting the second information pulses includes inhibiting the second information pulses for the selected delay time interval plus an additional time interval so that the first and second information pulses will not interfere with one another.

10. The method of claim 8 wherein the step of storing pulses includes:
  (1) counting the generated second information pulses in a counting means;
  (2) detecting if a count is present in the counting means and generating an output signal representative thereof;
  (3) delaying the output signal; and
  (4) transmitting a pulse over the transmission medium to the surface of the earth and subtracting a count from the counting means in response to the delayed output signal.

11. The method of claim 10 wherein the step of inhibiting the transmission of the second information pulse includes the steps of inhibiting the output signal representative of a detected count and inhibiting the second information pulse transmission over the transmission medium inhibiting the subtraction of a count from the counting means.

12. A method of transmitting signals from a tool in a borehole to the surface of the earth over a transmission medium comprising:
  (a) generating first information signals representative of a first information for transmission to the surface of the earth;
  (b) generating pulses representative of a second information;
  (c) supplying the pulses representative of the second information to the transmission medium for transmission to the surface of the earth;
  (d) inhibiting the transmission of the second information pulses to the surface of the earth in response to the generated first information signals so that the second information pulses will not interfere with the first information signals; and
  (e) storing the pulses representative of the second information for later transmission to the surface of the earth so that the inhibited second information pulses will not be lost.

13. Apparatus for transmitting signals from a tool in a borehole to the surface of the earth over a transmission medium, comprising:
  (a) means for generating first information signals representative of a first information for transmission to the surface of the earth;
  (b) means for generating pulses representative of a second information;

(c) means for storing the second information pulses for subsequent transmission to the surface of the earth; and (d) means responsive to the first information signals for inhibiting the transmission of the second information pulses for a given time interval each time a first information signal is generated whereby the second information pulses will not interfere with the transmission of the first information signals, yet the inhibited second information pulses will not be lost.

References Cited
UNITED STATES PATENTS 2,802,951 8/1957 Seevert _____ 340—18
3,251,029 5/1966 Savage et al. _____ 340—18

RODNEY D. BENNETT, Jr., Primary Examiner
CHARLES E. WANDS, Assistant Examiner